United States Patent [19]
Theysohn

[11] 3,728,056
[45] Apr. 17, 1973

[54] EXTRUDER CONTROL SYSTEM

[76] Inventor: Helmuth Theysohn, Wiehbergstrasse 25C, Hannover, Germany

[22] Filed: June 7, 1971

[21] Appl. No.: 150,407

[30] Foreign Application Priority Data

June 8, 1970 Germany..................P 20 28 064.2

[52] U.S. Cl. ................425/142, 425/145, 425/162, 425/164, 425/135
[51] Int. Cl...............................................B29c 3/06
[58] Field of Search.....................425/135, 140, 141, 425/142, 145, 146, 155, 162, 164, 166, 169, 170; 18/2 HA

[56] References Cited

UNITED STATES PATENTS

| | | | |
|---|---|---|---|
| 2,862,241 | 12/1958 | DeMattia | 425/125 |
| 3,111,707 | 11/1963 | Buckley | 425/162 |
| 3,191,233 | 6/1965 | Linderoth, Jr. | 425/146 |
| 3,283,041 | 10/1966 | Sommerfeld | 425/144 |
| 3,357,049 | 12/1967 | Spindler | 425/146 |

*Primary Examiner*—J. Spencer Overholser
*Assistant Examiner*—Brian P. Ross
*Attorney*—Robert E. Burns et al.

[57] ABSTRACT

A screw type extruder having a rotary extruder screw is provided with a variable speed drive motor for rotationally driving the extruder screw, material feeding means for feeding plasticizable material at a variable flow rate into the extruder, and a control system for controlling both the extruder screw speed and the flow rate of material fed into the extruder. The control system comprises a pressure sensor for sensing the plastic compound pressure within the extruder and a control device for controlling the rotational speed of the extruder screw in dependence upon the sensed pressure to maintain the compound pressure at a constant value. The control system further comprises a speed sensor for sensing the actual rotational speed of the extruder screw and another control device for controlling the volume of the plasticizable material fed into the extruder in dependence upon the sensed extruder screw speed to maintain the flow rate of the plasticizable material fed into the extruder at a constant value.

7 Claims, 1 Drawing Figure

PATENTED APR 17 1973     3,728,056
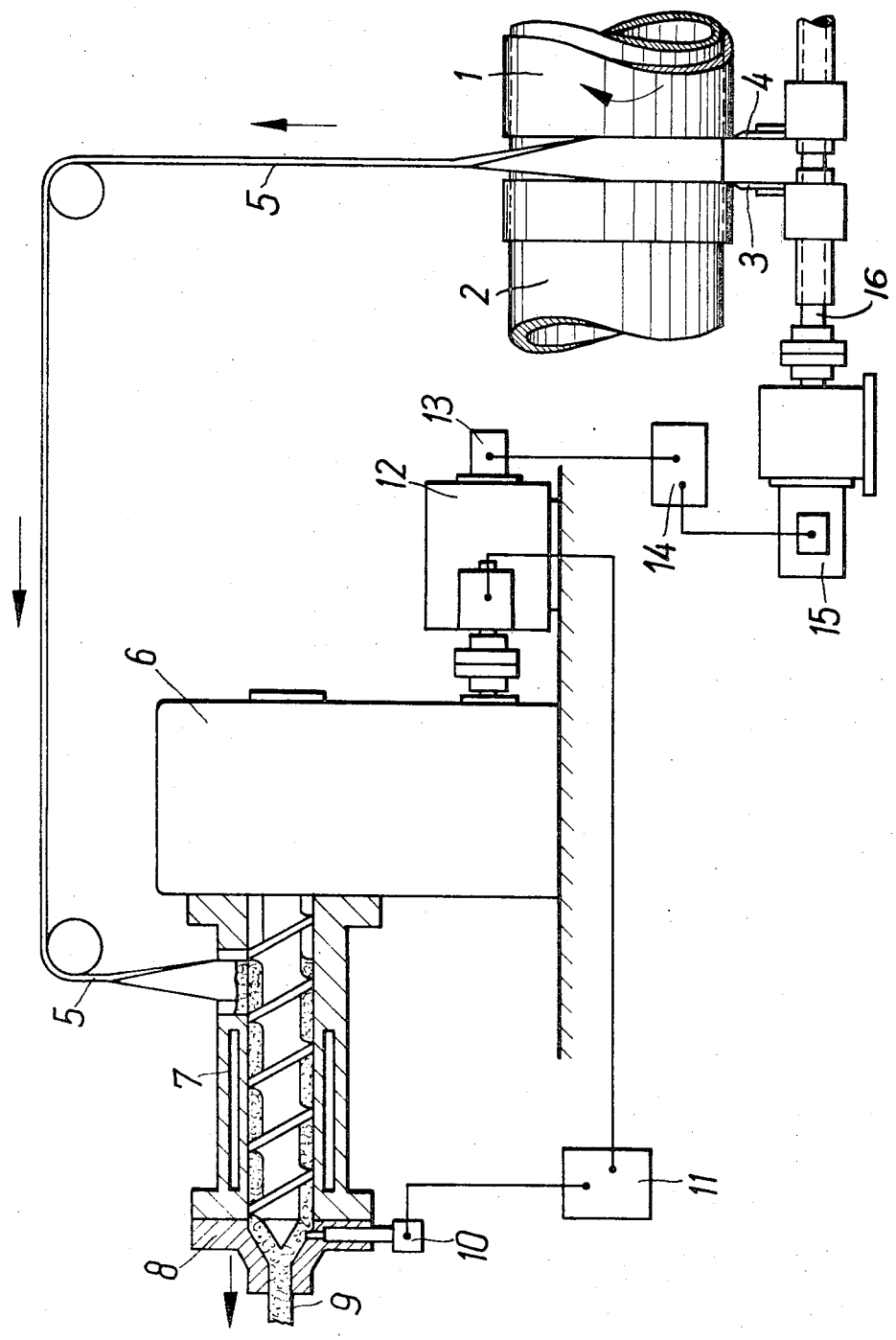

EXTRUDER CONTROL SYSTEM

The present invention relates to a control system for controlling the operation of an extruder and more particularly, to a control system for a screw type extruder.

Screw extruders are well known in the art and are used to manufacture tubes, sheets, treads or other articles composed of elastomers or thermoplastic polymers. It is desirable to operate such screw extruders so that the extrudate exits from the extruder head at a constant speed as well as having maximum dimensional stability.

Many screw tube extruders are equipped with infinitely variable speed drive mechanisms for rotationally driving the extruder screw at the optimum speed depending upon the existing conditions. One approach to maintain the compound pressure inside of the extruder head at a constant value has been to position a pressure sensor in the extruder head and control the extruder screw speed in response to the sensed pressure. This approach has not been wholly successful and the resulting extruded products are often unacceptable due to dimensional instability.

It was then learned that a constant compound pressure is not the only variable which need be considered in order to obtain products of sufficient stability, but it is also necessary to meter the volume of material fed into the extruder as a function of the extruder screw speed. A manual metering of the plasticizable material was attempted and the extruder operator would observe the amount of the material existing in the feed hopper and then manually change either the width or thickness of the strip material exiting from the warm-up mill to effect control of the material feed rate. The width of the strip material may be varied by changing the distance between the associated two mill knives which are employed to cut the strip into its desired width and the thickness of the strip material may be altered by adjusting the mill roll gap.

The manual approach also proved insufficient since the extruder operator could not manually alter the amount of feeding of the material until after he discovered that the hopper was either overfilled or underfilled and the time delays involved before the operator could effect suitable adjustment were too great and thus the product often times did not have the desired dimensional stability nor a constant extrusion speed. According to the present invention, the above-mentioned disadvantages are overcome by providing a control system which functions to maintain the compound pressure inside of the extruder head at a constant value by varying the extruder screw speed and then the amount of material fed to the extruder is metered as a function of the extruder screw speed whereby the extruder is evenly and uniformly filled.

It is therefore a primary object of the present invention to provide a control system for operating a screw type extruder such that the compound pressure within the extruder head is maintained at a constant value and the flow rate of material into the extruder is also maintained at a constant value.

Another object of the present invention is to provide a screw type extruder operable to extrude a product as a constant extruding speed and which has a high dimensional stability.

The control system of the present invention comprises a pressure sensor for sensing the compound pressure within the extruder head and a control device responsive to the pressure signals developed by the pressure sensor for accordingly controlling the extruder screw speed to maintain a constant compound pressure. The control system further comprises a speed sensor for providing an output speed signal proportional to the rotational speed of the extruder screw and a control device responsive to the speed signal for controlling the volume of plasticizable material fed into the extruder as a function of the extruder screw speed.

Having in mind the above and other objects that will be evident from an understanding of this disclosure, the present invention comprises the devices, combinations and arrangements of parts as illustrated in the preferred embodiment of the present invention which is hereinafter set forth in such detail so as to enable those ordinarily skilled in the art to readily understand the function, operation, construction and advantages of the invention when read in conjunction with the accompanying drawing in which:

The single FIGURE of drawing is a diagrammatic view of a screw-type extruder and extruder control system embodying the principles of the present invention.

As seen in the single FIGURE, a sheet of plasticizable material 1 composed of an elastomer or thermoplastic polymer is wrapped around a warm-up mill 2 which is rotationally driven by a drive mechanism (not shown). A pair of adjustable mill knives 3 and 4 are positioned adjacent the warm-up mill 2 to slice or cut the plasticizable material into a feed strip 5 which is conveyed along guide rollers to a screw-type extruder 6. The warm-up mill 2 and the adjustable mill knives comprises material feeding means for feeding the material to the inlet of the extruder 6, as explained hereinafter.

The extruder 6 is a well-known construction and comprises a rotationally driven extruder screw 7 positioned within a screw chamber. The strip material 5 is fed into the upstream end of the screw chamber whereupon it is compressed and masticated while being simultaneously advanced longitudinally through the screw chamber by means of the extruder screw. An extruder head or die 8 is positioned at the downstream end of the screw chamber and recives therethrough the masticated plastic material and forms same into the shape of tubes, wide sheets or any other desired configuration depending upon the shape of the extruder head orifice. Positioned around the screw chamber are heating elements (not numbered) which may be used to provide additional heat energy to the plasticizable material to aid in forming the strip material into a plastic condition.

The control system of the present invention includes a pressure sensor 10 disposed inside of the extruder head 8 operable to sense the compound pressure of the plastic material inside the extruder head and provide a corresponding electrical pressure signal. A control device 11 is electrically connected both to the pressure sensor 10 and to an infinitely variable drive motor 12 which is connected through a suitable mechanical transmission to the extruder screw 7. The control device 11 continuously receives a pressure signal from the pressure sensor 10 and whenever this signal deviates a predetermined amount from a preset value, the control device 11 develops an appropriate speed signal and coacts with the infinitely variable drive motor 12 to accordingly control the speed thereof whereby the extruder screw 7 is either accelerated or decelerated to maintain the compound pressure at a constant value.

Also connected to the drive motor 12 and constituting part of the control system is a speed sensor comprising a tachometer 13 for continuously detecting the rotational speed of the drive motor and providing a corresponding electrical speed signal which is directly proportional to the rotational speed of the extruder screw 7. The output speed signal from the tachometer 13 is fed to another control device 14 which converts same into either positive or negative impulses in dependence upon whether the drive motor speed has either increased or decreased from its initial preset value. These positive or negative impulses are a function of the change in speed of the extruder screw 7 and comprise a command signal which coacts with the material feeding means, as delineated below, to control the volume or flow rate of the material strip fed into the extruder whereby a constant and uniform filling of the extruder screw can be obtained irregardless of the rotational speed of the extruder screw 7.

In the embodiment shown, an electrically-controlled motor 15 is connected through a gear reduction unit to rotationally drive a spindle 16 upon which are movably mounted the mill knives 3 and 4. The spindle 16 is provided with a set of left-hand threads and a set of right-hand threads which coact with mating threads provided on the mill knives 3 and 4, respectively, whereby rotational movement of the spindle 16 in one direction causes the mill knives 3 and 4 to translate towards each other along the spindle thereby decreasing the width of the strip 5 being cut whereas rotational movement of the spindle in the other direction causes the mill knives 3 and 4 to separate farther apart thereby increasing the width of the strip 5. The command signal from the control device 14 is fed to the motor 15 and the polarity and magnitude of the command signal determine the direction and extent of angular movement of the spindle 16. By this arrangement, the feeding of the plasticizable material into the extruder is automatically controlled in dependence upon the actual extruder screw speed whereby the feeding flow rate of material into the extruder head 8 is maintained at a constant value.

In an alternative arrangement, the control device 14 could be directly connected to the mill roll gap-adjusting motors of the warm-up mill 2 to accordingly vary and control the thickness rather than the width of the strip 5. Also, if the warm-up mill 2 is equipped with a variable speed drive system, then the control device 14 can be connected to the variable speed drive system of the warm-up mill 2 to increase or decrease the feeding speed of the material strip 5 and it should be noted that both of these alternative approaches result in obtaining a constant feeding rate of the extruder.

What I claim and desire to secure by Letters Patent is:

1. In combination with an extruding apparatus having means defining a screw chamber having a material inlet for receiving a plasticizable material and a material outlet; an extruder head connected to said material outlet; a rotatable extruder screw positioned within said screw chamber cooperative with said screw chamber to plasticize the plasticizable material fed into said material inlet and advance same through said material outlet and out said extruder head as an extruded product; variable speed drive means for rotationally driving said extruder screw at a variable rotational speed; and material feeding means for feeding plasticizable material at a variable flow rate into said material inlet, a control system for controlling both the extruder screw speed and the flow rate of material fed into said material inlet comprising: pressure sensing means for sensing the pressure of the plasticized material contained within said extruder head and providing a corresponding electrical pressure signal; first control means receptive of said electrical pressure signal and coacting with said variable speed drive means for controlling the rotational speed of said extruder screw in accordance with said pressure signal to maintain the pressure of the plasticized material within said extruder head at a substantially constant value speed sensing means for providing a speed signal proportional to the actual rotational speed of said extruder screw; and second control means receptive of said speed signal and coacting with said material feeding means for controlling the feeding flow rate of the plasticizable material into said material inlet as a function of the actual extruder screw speed to maintain the flow rate of the plasticizable material fed into said material inlet at a substantially constant value.

2. A combination according to claim 1; wherein said material feeding means comprises means for feeding plasticizable material to said material inlet in an elongated strip configuration, and means for selectively varying the width of the elongated strip fed into said material inlet.

3. A combination according to claim 2; wherein said last-mentioned means comprises a pair of movably mounted cutting knives operative to cut the plasticizable material into an elongated strip, and means for effecting movement of said cutting knives to selectively vary the width of the cut elongated strip.

4. A combination according to claim 1; wherein said material feeding means comprises means for feeding plasticizable material to said material inlet in an elongated strip configuration, and means for selectively varying the thickness of the elongated strip fed into said material inlet.

5. A combination according to claim 1; wherein said material feeding means comprises means for feeding plasticizable material to said material inlet in an elongated strip configuration, and means for selectively controlling the feeding speed of the elongated strip fed into said material inlet.

6. A combination according to claim 1; wherein said speed sensing means comprises a tachometer connected to said variable speed drive means operable to provide an electrical speed signal proportional to the actual rotational speed of said extruder screw.

7. A combination according to claim 6; wherein said second control means includes means responsive to said electrical speed signal for providing an electrical command signal of either positive or negative polarity to said material feeding means to accordingly effect either an increase or decrease in the flow rate of the plasticizable material in accordance with the change in speed of said extruder screw.

* * * * *